25551

Dec. 18, 1962 H. E. McALLISTER 3,069,512

TELEPHONE EQUIPMENT

Filed Sept. 19, 1958 6 Sheets-Sheet 1

| | |
|---|---|
| FIG. 4 | FIG. 5 |
| FIG. 6 | FIG. 7 |

INVENTOR.
HARRY E. McALLISTER

BY Jerome R. Cox

ATTORNEY

INVENTOR.
HARRY E. McALLISTER
BY
Jerome R. Cox
ATTORNEY

Dec. 18, 1962 H. E. McALLISTER 3,069,512

TELEPHONE EQUIPMENT

Filed Sept. 19, 1958 6 Sheets-Sheet 3

INVENTOR.
HARRY E. McALLISTER

BY

Jerome R. Cox
ATTORNEY

Dec. 18, 1962 H. E. McALLISTER 3,069,512

TELEPHONE EQUIPMENT

Filed Sept. 19, 1958 6 Sheets-Sheet 4

INVENTOR.
HARRY E. McALLISTER

BY

Jerome R. Cox

ATTORNEY

Dec. 18, 1962 H. E. McALLISTER 3,069,512

TELEPHONE EQUIPMENT

Filed Sept. 19, 1958 6 Sheets-Sheet 5

INVENTOR.
HARRY E. McALLISTER
BY
Jerome R. Cox
ATTORNEY

Dec. 18, 1962 H. E. McALLISTER 3,069,512

TELEPHONE EQUIPMENT

Filed Sept. 19, 1958

6 Sheets-Sheet 6

INVENTOR.
HARRY E. McALLISTER

BY

Jerome R. Cox

ATTORNEY

United States Patent Office 3,069,512
Patented Dec. 18, 1962

3,069,512

TELEPHONE EQUIPMENT

Harry E. McAllister, 3201 Bonnieview Ave., Lima, Ohio

Filed Sept. 19, 1958, Ser. No. 762,110
5 Claims. (Cl. 179—175.2)

The invention disclosed and claimed in this application relates to telephone equipment. In illustration of the invention I have disclosed an apparatus designed for the purpose of testing the operating telephone circuits, switches and other equipment of a telephone system to determine the efficiency thereof and to locate faults therein.

*Objects*

One of the objects of my invention is to provide testing equipment operative to dial selected numbers automatically and continuously without supervision until a fault is encountered and thereupon to seize such faulty equipment and hold it until supervising personnel can locate and correct such fault.

A further object of my invention is to provide a device which will operate the dial central office equipment exactly as a subscriber on the exchange would operate the central office equipment in dialing for any number that he or she may wish to dial and that is served by the central office equipment, operating the central office equipment under the same conditions as encountered by a subscriber, that is, under both light load or heavy load conditions.

A further object of my invention is to provide a device which will test the complete train of the central office equipment at the same time, just as a subscriber would do in dialing a number.

A further object of my invention is to provide equipment to test dial telephone central office equipment to determine the grade of service the subscribers attached to the dial central office equipment are receiving, and to provide information to show the type of service being received—whether one call is lost in 500 attempts, 800 attempts, 1000 attempts, or 2500 attempts, etc. It accomplishes this result by continuously dialing, automatically, predetermined or selected numbers without close supervision. These numbers can be any numbers served by the central office equipment. The equipment records the number of calls attempted and the number of calls completed. To this end two registering meters are provided, one for registering the total number of calls originated and one for registering the total number of calls completed. These meters indicate the physical condition of dialing equipment inasmuch as the number of lost calls can readily be obtained from a comparison of the two meters. Thus by subtracting the calls completed meter reading from the calls originated meter reading, the grade of service being received by the subscribers can be accurately obtained. This information is very necessary from the standpoint of personnel at the executive level.

A further object of my invention is to provide a device by which all elements of the switch train of a telephone central office equipment are tested when connected in the normal manner. In larger offices, the elements concerned are staggering in number. If, for instance, you were in a large telephone exchange, say at telephone Catherine 5–6646 and calling telephone number Catherine 9–9616 the call would go through a "line finder", a "first selector", a "second selector", a "third selector", and a "connector switch". When the receiver is first lifted to get a dial tone, the call can be picked up by any one of 20 "line finder" switches. Each of these line finder switches has 50 "first selector" switches which actually furnish the dial tone. So at this point, a subscriber has had a possible choice of 20×50, or 1000 possible paths to get the dial tone. The subscriber now dials the CA. This will give him a "second selector" switch, and since each "first selector" switch has a choice of 20 "second selector" switches, we now have had a possible choice of 20 times 1000, or 20,000 possible paths to reach a "second selector" switch. The subscriber now dials the first 9. This will get a "third selector" switch; and since each "second selector" switch has a choice of 20 "third selector" switches, the subscriber has had a possible choice of 20 times 20,000 or 400,000 possible paths to reach a "third selector" switch. The subscriber next dials the second 9. This will get a "connector switch". Each "third selector" switch has a choice of 20 "connector switches", so that now the subscriber has had a choice of 20 times 400,000 or 8,000,000 possible paths to the "connector switch". He now dials the 616 which is all dialed on the connector switch, and since the subscriber had a choice of 20 connector switches, each one having a choice of the 616, he now has had a choice of 20 times 8,000,000 or 160,000,000 possible paths to reach the number dialed.

On the basis of the above, it is easily seen that the maintenance personnel has a very difficult task to try on a manual basis (i.e. without some device such as that which I have provided) to locate a fault which may be encountered in such a dialing process. At the very best, it is a time and energy consuming process. My automatic dialing routiner eliminates this as it will dial and re-dial until it runs into the fault, and then hold the equipment for the maintenance personnel to locate and correct. It is very valuable in testing out new equipment installations, prior to placing the new equipment into service.

Features of my invention include the following:

(1) It will test the local subscriber's central office dial equipment.

(2) It will test the toll dial central office equipment.

(3) It can be attached to any local subscriber's line equipment served by the exchange.

(4) It can dial any local subscriber's number served by the exchange.

(5) It can dial any toll code served by the exchange.

(6) It can be attached to any selector switch in the number or code train.

(7) When a number being dialed has been correctly reached, it will automatically release the switch train and re-dial the number or code. This re-dialing or recycling will continue until a failure is encountered.

(8) If the correct number or code is not reached, it will stop dialing.

(9) When the dialing is stopped for any reason, an uninterrupted alarm is sounded.

(10) It registers the number of calls originated.

(11) It registers the number of calls completed.

(12) It will release the switch train and re-dial the number or code upon the receipt of an A.C. generator current to the "called number" end of the routiner.

(13) It will release the switch train and re-dial the number or code upon the receipt of a T–R lead reversal to the "calling number" side of the routiner.

(14) It will not start dialing until the equipment attached to the "calling number" side of the routiner notifies the routiner it is ready to receive the dialing pulses from the routiner.

(15) The dialing pulses are created by a three-relay "free running pulse generator".

(16) A jack is provided to "measure" the correctness of the created pulses by the use of an external pulse meter.

(17) A jack is provided to attach a receiver to the switch train to listen for any busy or equipment butt-in encountered.

(18) A lamp is provided to visually indicate that the pulse generator is running, giving a visible flashing lamp signal.

(19) A lamp is provided to visually indicate that the "connector switch" is prepared to be answered.

(20) It provides a "hold ground" to hold the switch train if a fault is encountered on the T–R loop during dialing.

(21) It may be released manually.

(22) An attendant, after placing the routiner in operation, is no longer required until a fault is encountered. This fault will be indicated by the sounding of the uninterrupted alarm.

(23) While the embodiment illustrated shows a device which can dial a number containing a total of ten digits, more switches can be added if desired so as to dial a total of more than ten digits. The equipment can transmit 1 to 10 (or more) digits.

(24) The dialing can be limited to any number of switches up to the total provided by the device simply by setting a "trunk off" switch to the total number of digits contained in the number to be dialed. The number of digits being dialed can be manually controlled, simply by setting the "trunk off" switch on position #1 and then advancing it one step at a time as each digit has been dialed, until the total digits desired has been dialed. This feature allows the maintenance personnel to examine each individual piece of equipment for proper functioning as it is being dialed.

(25) Timing between digits is variable, being controlled by the setting of the 10,000 ohm variable resistor in series with the 500 mf. electrolytic condenser and relay D.

(26) Adequate contact spark protection is provided.

(27) The routiner may be used to dial from any part of the "switch train" used in the "calling number" equipment, by attaching the tip-ring-sleeve wires of the cord used for the "calling number" equipment to the tip-ring-C leads respectively of the desired switch.

(28) The audible alarm will sound intermittently as long as the dialing is proceeding, thus giving maintenance personnel an audible indication that the dialing is proceeding.

(29) No highly trained personnel are required to maintain the simplified apparatus and circuit.

(30) The apparatus creates and transmits pulses.

(31) The apparatus will not transmit pulses until the dial equipment is ready to receive them, and for this it does not depend upon receipt of the dial tone.

(32) Manual pulsing can be used with a test telephone plugged into the receiver jack, which operation is valuable for testing the differences of operation of certain types of equipment.

(33) A test telephone can be plugged into the receiver jack and can be used to listen or talk, during or after the sending of one or more digits, which is valuable for checking "busys" or "butt-ins".

(34) When the equipment is dialing any number on the exchange, a telephone may be even left on the line and observed to determine whether the bells are ringing properly.

(35) The equipment will re-cycle upon the receipt of ringing current alone from the connector switch, or wait until both ringing current and reversal of battery is received from the connector switch.

(36) The equipment tests the connector switch ringing feature.

(37) The equipment tests the connector switch answer feature the same as a subscriber would do on lifting the receiver after the bells have been rung.

(38) The equipment tests the connector switch for reverse battery feature which is valuable for toll train equipment tests.

(39) The equipment gives a visible (steady lamp) indication that the reverse battery operation of the connector switch is to be used to cause the routiner to re-dial.

(40) The equipment will put positive battery forward on the C-lead to hold the switch train for certain types of encountered faults such as open tip or ring leads.

(41) The equipment provides optional loop resistance for seizing the central office equipment.

Further objects and features of my invention should be apparent from the following specification and claims when considered in connection with the accompanying drawings illustrating embodiments of my invention.

*Drawings*

I have illustrated embodiments of my invention in the accompanying drawings wherein.

Figure 1:
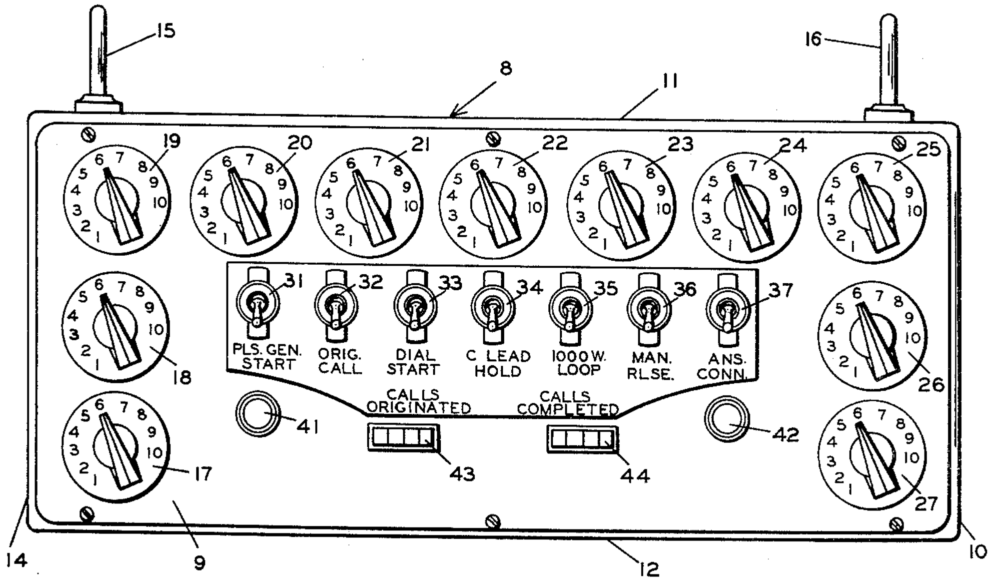
FIG. 1 is a view in front elevation of routiner apparatus for testing telephonic equipment comprising one embodiment of my invention.
Figures 2, 3:
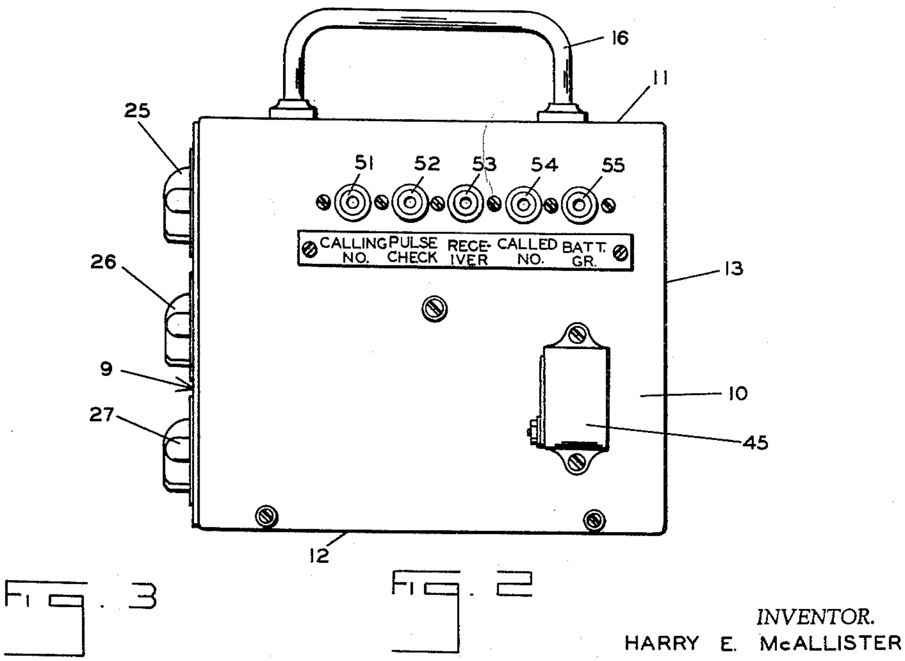
FIG. 2 is a view in end elevation of the routiner apparatus shown in FIG. 1.
Figure 4:
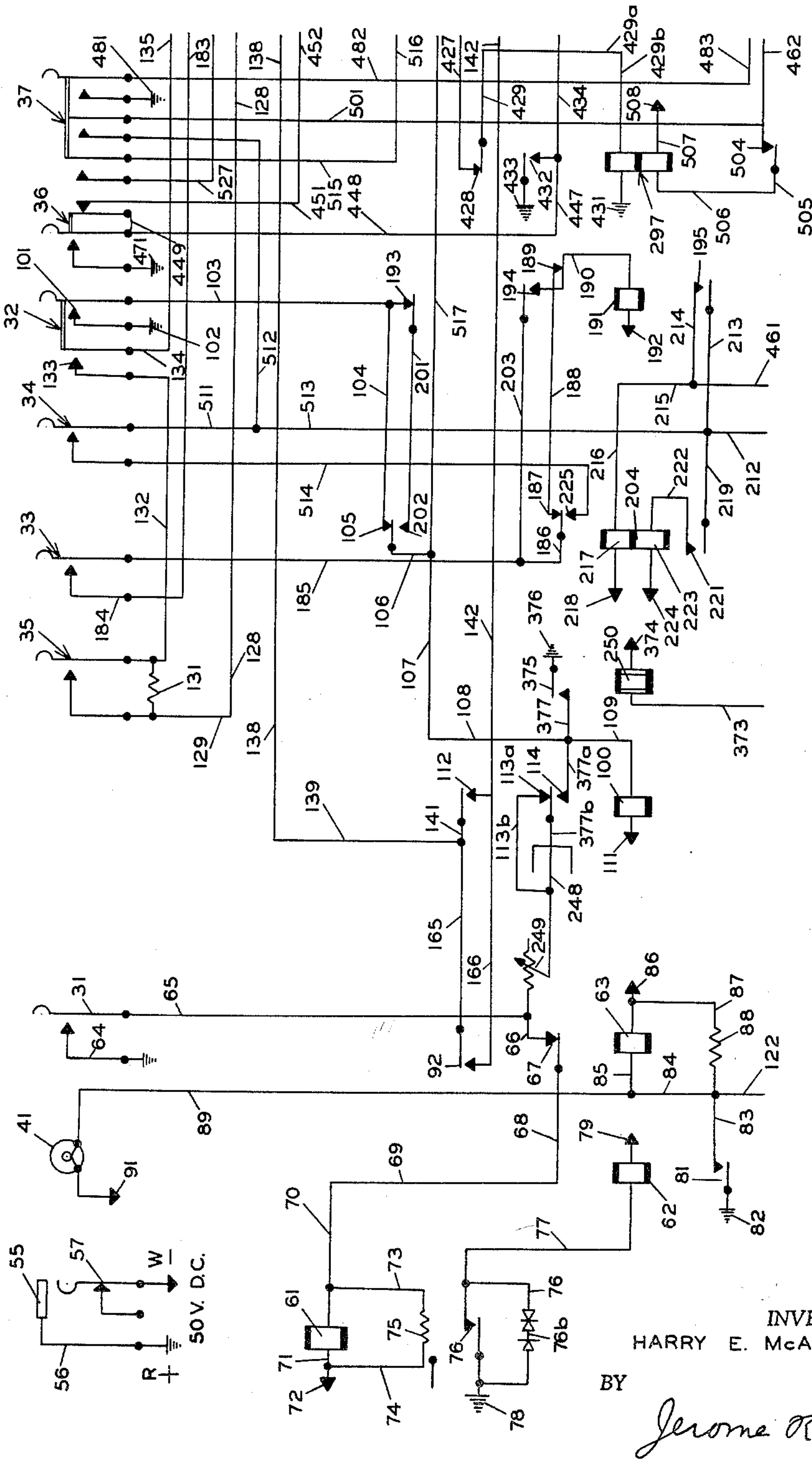
Figure 3:
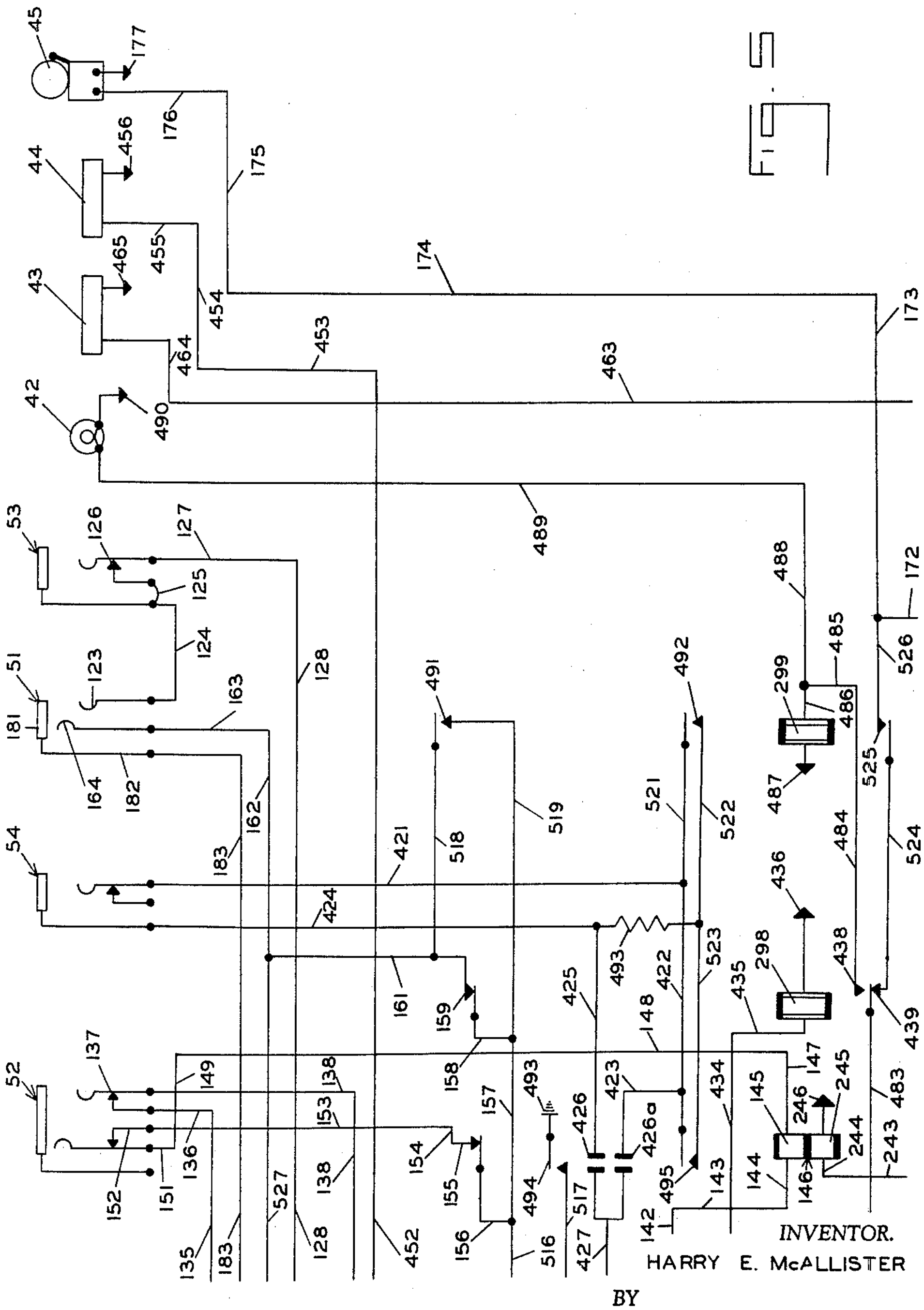
Figure 5:
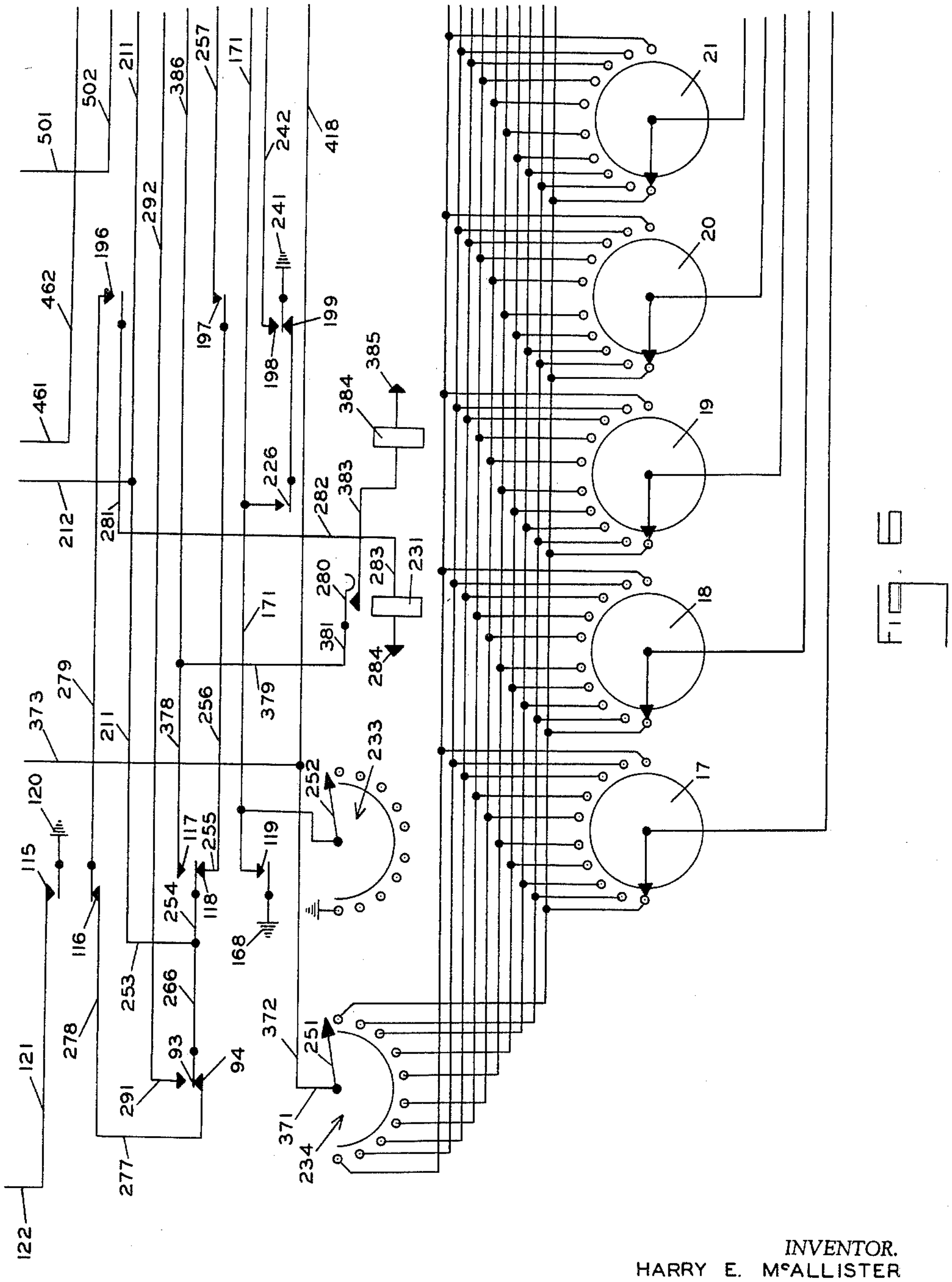
Figure 7:
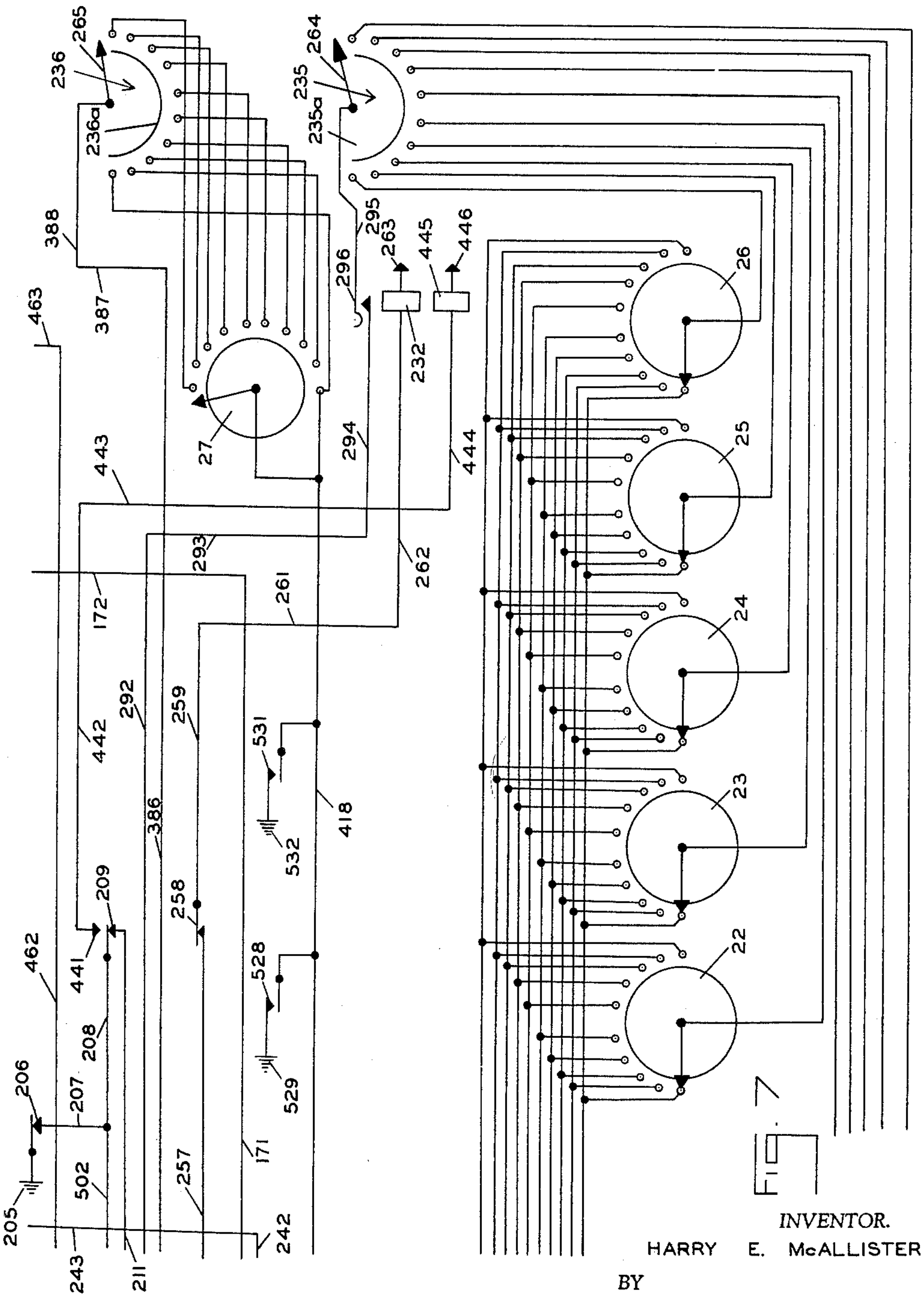
Figure 8:
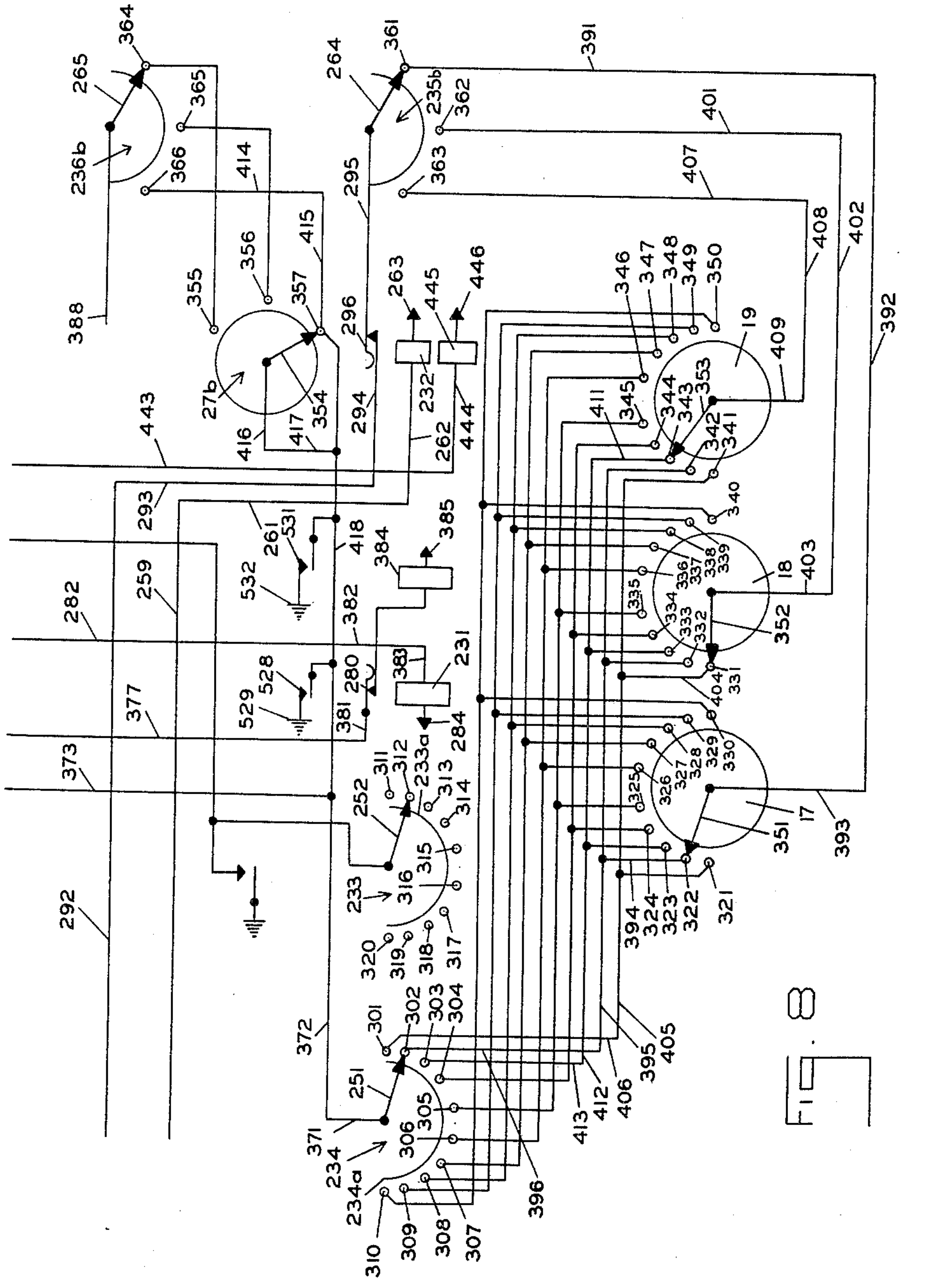

FIG. 3 is a diagrammatic sketch showing the relationship of FIGS. 4, 5, 6 and 7 to each other, such FIGS. 4, 5, 6 and 7 consisting together of a wiring diagram of the wiring, relays, switches, resistances, condensers, etc. contained within the casing of the routiner illustrated in FIGS. 1 and 2;

FIG. 4 is a diagrammatic drawing showing the upper left hand section of the wiring diagram referred to above in connection with FIG. 3;

FIG. 5 is a diagrammatic drawing showing the upper right hand section of the wiring diagram referred to above in connection with FIG. 3;

FIG. 6 is a diagrammatic drawing showing the lower left hand section of the wiring diagram referred to above in connection with FIG. 3;

FIG. 7 is a diagrammatic drawing showing the lower right section of the wiring diagram referred to above in connection with FIG. 3; and FIG. 8 is a diagrammatic drawing showing a simplified wiring diagram of a portion of the wiring, relays, digit switches and the stepping switches, etc. of the illustrative embodiment of my invention, some of the switches and wiring being omitted for simplicity and some of the switches being simplified for clarity.

*Detailed Description*

Referring specifically to FIGURES 1 and 2 of the drawings, I have shown in FIG. 1 a front view of my dialing routiner. As may be seen, it comprises a casing 8 having a front panel 9. It has a side panel 10 and an upper face 11. It has a bottom face 12, rear face 13 and second end face 14. The upper face 11 is provided with two handles 15 and 16. On the front panel 9 there are provided digit switches 17, 18, 19, 20, 21, 22, 23, 24, 25 and 26, and trunk off switch 27. There are also provided a pulse generating starter toggle switch 31, a toggle switch to originate calls 32, a dial start toggle switch 33, a C-lead hold toggle switch 34, a thousand ohm loop toggle switch 35, a manual release toggle switch 36, and an answer connector toggle switch 37. Also provided on the face of the front panel 9 is a pulse generator lamp 41 and an answer connector lamp 42. Also provided on the front panel are indicating meters for calls originated and completed. The indicating meter for the calls originated is designated as 43, the indicating meter for calls completed is designated as 44. On the end panel 10 there is provided an alarm bell 45. Also, on the end panel 10 there are provided five jacks. Thus there is provided a jack 51 for the calling number plug, a jack 52 for the pulse check plug, a jack 53 for the receiver plug, a jack 54 for the called number plug, and a jack 55 for the battery plug. The jack 55 has a connection 56 to positive ground and a connection 57 to negative battery (see FIG. 4).

The digit switches, toggle switches, tip ring and sleeve leads of the plug jacks, lamps, meters, are all interconnected by wiring as shown in FIGS. 4, 5, 6 and 7, the wiring of the four figures being interconnected as diagrammatically indicated in FIG. 3.

*Preparation for Operation*

When the routiner is initially prepared for operation, all seven of the toggle switches 31–37, inclusive, are set to their "off" positions. A battery plug is inserted in the battery ground jack 55 (FIG. 4) so that the tip wire of the plug is connected to a negative battery connection and the sleeve wire to positive battery connection or ground. This supplies operating current to the routiner. Next, a plug is inserted in the calling number jack 51 (FIG. 5). The tip, ring and sleeve wires are connected to the line equipment associated with the number selected to be used as the calling number so that the tip wire is connected to the tip of the line, ring wire to the ring of the line, and the sleeve wire to the C-lead of the line equipment. Next, a plug is inserted in the called number jack 54 (FIG. 5) and the tip and sleeve wires are connected to the tip and ring respectively of the line equipment associated with the number selected to be used as the called number. Next, the digit switches 17 to 26, inclusive (FIGS. 6 and 7), are set to the various digits contained in the called number (i.e. digit switch 17 is set to the first digit of the number, digit switch 18 to the second digit of the number, digit switch 19 to the third digit of the number, etc.). Next the trunk off switch 27 (FIG. 7) is set to the number corresponding to the total number of digits contained in the selected number to be dialed. Next, the pulse generating starter toggle switch 31 (FIG. 4) is moved to its "on" position. This starts the three-relay (relays 61, 62 and 63—FIG. 4) pulse generator running.

*Pulse Generator*

The operation of this pulse generator is now explained with reference especially to FIG. 4 as follows: The spring 64 is connected to ground and by means of the switch 31 is connected through the lead 65, lead 66, relay contacts 67, leads 68, 69 and 70 to the relay 61 and thence through lead 71 to negative battery connection at 72. This energizes relay 61. Bypass 73—74 connects the lead 70 through resistance 75 with the lead 71. The relay 61 controls the relay contacts 76 by which a lead 77 is connected to ground at 78. The lead 77 is also connected to the relay 62 and through it to negative battery connection at 79. Closing of contacts 76 by relay 61 energizes relay 62. A bypass 76*a* is provided around relay contacts 76 with a rectifying unit 76*b* inserted in the bypass to prevent arcing of the contacts 76. Such or similar rectifying units may be provided elsewhere in the various circuits to protect various contacts as desired.

The energizing of the relay 62 closes contacts 81 whereby ground connection 82 is connected through leads 83, 84 and 85 to relay 63 and through it to negative battery connection 86. This energizes relay 63. A bypass connection 87 connects lead 83 with negative battery connection 86, a resistance 88 being inserted in the bypass 87 in order to protect contacts 81. It also increases the release time of the relay 63 armature. Similar resistances may be provided elsewhere in the various circuits if desired for similar purposes. Pulse generating lamp 41 is connected through a lead 89 with lead 84 whereby current can flow from ground 82 through switch 81, leads 83, 84 and 89, and pulse generating lamp 41 to negative battery connection at 91. Therefore, as contact 81 is closed by relay 62, relay 63 is energized and lamp 41 is caused to be lit. The energizing of relay 63 breaks relay contacts 67 and closes a relay contact 92. It also closes relay contact 93 and opens relay contact 94 (both shown in FIG. 6). The effect of the closing of contact 92 and the closing of contact 93 and the breaking of contact 94 will be disclosed hereafter.

The breaking of contact 67, however, breaks the connection between the ground at 64 adjacent to the pulse generating starter switch 31 and the negative battery connection 72 and thus de-energizes relay 61. This in turn breaks the contact connection at 76 and de-energizes relay 62 and this in turn breaks the contact connection at 81 and de-energizes relay 63 and causes lamp 41 to be extinguished. This in turn closes the relay contact 67 and re-connects the ground 64 through the relay contact 67 to energize relay 61 again as explained above. Whenever contact 81 closes, the lamp 41 is lit and when contact 81 is opened, the lamp 41 is extinguished. The cycle is repeated again and again, the flashing of the pulse generator lamp 41 showing at each time of the energizing of relay 63. The total time of each cycle bears a relation to the total time of operation of the three relays 61, 62 and 63. Increasing the number of relays or the time of operation of any one or more of them would change the length of the pulsing cycle. This time cycle is effectively used at contact 92 to convey pulses to the calling number jack 51 and the calling number equipment as will be later described.

*Operation of "Originate Calls" Switch*

The next step in the operation of the routiner is to operate manually the switch to originate calls 32 to a closed position. This switch 32 is a double pole switch and is effective (1) to complete a circuit to energize the relay 100 and (2) to complete a circuit through the calling number equipment by means of the calling number jack 51 and the line equipment associated therewith.

The toggle switch 32 has a ground at 102. The ground 102 of the double pole switch 32 is connected through the subswitch 101 of switch 32 and the lead 103, lead 104, relay contact 105, lead 106, lead 107, lead 108 and lead 109 to the relay 100 and thus to the negative battery connection 111. The relay 100 is thus energized. Operation of the relay 100 operates relay contacts 112, 113, 114, 115, 116, 117, 118 and 119 (contacts 112, 113 and 114 are shown in FIG. 4 and all of the other relay contacts 115, 116, 117, 118 and 119 are shown in FIG. 6).

Relay 100 operates to close relay contacts 112, 114, 115, 117 and 119. It operates to break connections at contacts 113, 116 and 118. The purpose of the contacts 113, 114, 116, 117, 118 and 119 will be described in detail later herein. The closing of the contact 112 is effective as used in connection with the circuit established through the calling number 51 and will be explained shortly. The closing of the contact 115 (FIG. 6) creates a circuit from the ground 120, through leads 121 and 122 and through leads 84 and 85 (FIG. 4) through the relay 63 to the negative battery connection 86. This energizes relay 63 irrespective of the condition of contact 81 and holds relay 63 energized so long as relay 100 is energized and also maintains the circuit through the lamp 41 closed so that the lamp continues shining and the pulsing generator relays 61 and 62 cease to operate. The purpose of the shorting of the relay 63 from the ground 120 as just described is to insure the uniformity of the length of the first pulse when the pulsing is started for each digit as will be later more fully explained.

As stated above, a circuit is also completed by closing of toggle switch 32 to the calling number telephone line and thus the calling number line is seized. The tip wire of the line equipment of the calling number is connected to positive or ground. The tip wire of the calling number plug is thus connected through the tip wire of the calling number to ground and is in turn connected to the tip spring 123 (FIG. 5) of the calling number jack 51. Spring 123 is connected through lead 124, lead 125, tip spring 126 of receiver jack 53, lead 127, lead 128, lead 129 (FIG. 4), resistance 131, lead 132, subsidiary switch 133 of toggle switch 32, spring 134, lead 135, spring 136 (FIG. 6), tip spring 137 of the pulse check jack 52, lead 138, lead 139 (FIG. 4), lead 141, relay contact 112, lead 142, lead 143 (FIG. 6), and lead 144, upper coil 145 of relay 146, lead 147, lead 148, lead 149, spring 151, ring spring 152 of pulse check jack 52, lead 153, lead 154, relay contacts 155, lead 156, lead 157, lead 158, relay contacts 159, lead 161, lead 162, ring lead 163, and the ring spring 164 of the calling number jack 51 which is connected to the ring of the line which is connected to the negative battery. The line equipment has now been seized and, through its operation, a call has now been originated on the telephone equipment which is now ready to receive pulses. Ground is now returned on the sleeve of the calling number plug from the telephone equipment.

It should be noted that the fact that although the relay 100 (FIG. 4) is energized and its relay contact 112 is thereby closed, and the relay contact 112 thus is a part of this circuit to the calling number, nevertheless the relay 63 is also energized and thereby relay contact 92 is also closed and the contact 92 thus makes a second path from lead 139 through lead 165, contact 92, lead 166, to lead 142 to complete said second circuit to the calling number.

The closing of contact 119 (FIG. 6) creates a circuit from ground 168 through contact 119, lead 171, lead 172 (FIG. 7), lead 173 (FIG. 5), lead 174, lead 175, and lead 176 to alarm 45, and thence to negative battery connection 177, thus causing the alarm to sound.

*Operation of Relay 191*

Thereafter the dial start toggle switch 33 (FIG. 4) is manually operated to its closed position. This causes a circuit to be formed from the ground of the sleeve of the calling number jack 51 (FIG. 5) through the sleeve spring 181 of said calling number jack 51, thence through leads 182, 183, 184 (FIG. 4), switch 33, lead 185, lead 186, relay contact 187, lead 188, contact 189, lead 190, relay 191, and to the negative battery connection 192. This energizes relay 191. The energizing of relay 191 operates contacts 193, 194, 189, 195, 196, 197, 198 and 199 (196, 197, 198 and 199 being shown in FIG. 6). Contacts 189, 193, and 199 are broken by energization of the relay 191. Contacts are closed in contacts 194, 195, 196, 197 and 198, by reason of the energizing of the relay 191. The breaking of contacts 193 has no effect on the circuits (previously described) from the ground 102 through the relay 100 to the battery connection 111. However, it does insure that if contact 193 is opened by relay 191 at a time when contact 105 is broken, no current flows from the ground 102 through switch 101, lead 103, switch 193, lead 201, switch 202, leads 106, 107, 108, and 109, to relay 100 so long as relay 191 remains energized.

The making of contact 194 which occurs before the breaking of contact 189 provides an alternate path for the flow of current from the lead 185 through lead 203, contact 194 and lead 190 through relay 191. Thus, regardless of the breaking of the contact at contacts 187 and 189, relay 191 remains energized.

The closing of contact 195 provides a circuit which energizes one of the coils of the relay 204. A ground 205 (FIG. 7) (which is the main ground of the circuit illustrated) is connected through relay contact 206, to a lead 207, through a lead 208, relay contact 209, a lead 211, a lead 212 (FIG. 6), lead 213 (FIG. 4), contact 195, lead 214, leads 215 and 216 through upper coil 217 of relay 204 and thence to negative battery connection 218. Relay 204 is thus energized.

The lead 212 (FIG. 4) is also connected to a lead 219 which is connected by a normally open contact 221 to a lead 222 connected to the lower coil 223 of the relay 204 and thence through the relay to a negative battery connection 224. When the upper coil 217 of the relay 204 is energized, it closes contact 221 so that the circuit is also formed through the lower coil 223 of the relay. Thus when the relay 204 is once energized through the upper half 217 thereof, the contact 221 constitutes a holding circuit for the relay 204 and the relay 204 remains energized until either the contact 206, or 209 is broken as will be later described.

The operation of relay 204 (FIG. 4) breaks the relay contact 105; makes contact at the normally open relay contact 202; breaks the relay contact 187; and closes the normally open relay contact 225; and as stated above, closes the normally open relay contact 221. It also closes the normally open relay contact 226 (FIG. 6). The effect of the opening of relay contacts 105 and 187, and the effect of closing the contacts 202, 225 and 226, will be later described.

When the relay 191 (FIG. 4) is energized as stated above, it closes relay contacts 196 and 197 (both shown in FIG. 6) which are in the control circuits of minor switch magnets 231 (FIG. 6), and 232 (FIG. 7) controlling respectively the moving of wipers 251 and 252 (both in FIG. 6), and of wipers 264 and 265 (both in FIG. 7). This operation will be described more fully later.

The operation of relay 191 (FIG. 4), as explained above, also closes relay contact 198 (FIG. 6) and thereby connects a ground 241 through the relay contact 198, the leads 242, 243 and 244 (FIG. 5) to the lower coil 245 of relay 146 and thence to negative battery connection 246. It should be noted, however, that the current flowing through the lower coil 245, of relay 146 flows in the opposite direction to the current flowing through the upper coil 145 of the relay 146 which is connected to positive battery at the tip spring 123 of calling number jack 51 and to negative battery at the ring spring 164 of the calling number jack 51. The contacts controlled by the relay 146 are not opened or closed, as the case may be, unless current is flowing through both parts of the relay in the same direction at the same time. Current flowing in either coil 145 or 245 alone is not strong enough to completely energize the relay 147. Therefore, current flowing through the lower part 245 of relay 146, as just described, has no effect on the contacts controlled by the relay 146.

*Operation of Relay 204*

Relay contacts 105 (FIG. 4) are broken by the operation of relay 204 and thus (inasmuch as relay contact 193 has normally at such time been opened by relay 191) de-energizes relay 100. However, current now flows for a short time to charge the capacitor 248 in series with the relay 100, and holds the relay 100 energized during this time, the time depending upon the adjustment of the variable resistor 249.

The relay contacts controlled by relay 204 (FIG. 4) (i.e. contacts 105, 202, 187, 225, 221 and 226, FIGS. 4 and 6) have the following effects, when 204 is energized: The breaking of the relay contact 105 breaks the circuit from ground 102 to relay 100 and thus de-energizes relay 100 as just stated above. The making of the contact at 202 has no effect because relay 191 has already broken the contact at 193 and the circuit from the ground 102 to the relay 100 thus remains incomplete. The breaking of the relay contact 187 has no effect because at such time the circuit from 185 to relay 191 (which previously passed through lead 186, contacts 187, lead 188, contact 189, lead 190, to the relay 191 and negative battery connection 192) is now complete from lead 185 through lead 203, relay contacts 194 (closed by the relay 191), lead 190, relay 191 and negative battery connection 192. Contacts 194 are closed before contacts 189 are broken. The making of the connection at relay contacts 225 is not effective because toggle switch 34 has not yet been turned to the closed position. The making of the connection at contact 221 provides a holding circuit for the relay 204 as previously described from the main ground 205 through the leads 212 and 219, contacts 221, lead 222, and the lower coil 223 of relay 204, to the negative battery connection 224. The making of the connection at relay contacts 226 (FIG. 6) has no effect at this time because the connection at relay contacts 199 has been broken by the action of the relay 191.

Thus, when relays 191 and 204 (both shown in FIG. 4) are energized, the relay 100 is normally de-energized; except when relay 250 (FIG. 4) (later to be more fully described) is energized. The waning of the current in relay 100 allows the contact 115 (FIG. 6) to be broken within a short time and de-energizes the relay 63 (FIG. 4). This causes the pulsing circuit including relays 61, 62, and 63 to again begin operation, as described previously.

*Dialing*

As the pulsing circuit previously described again operates, the relay 63 is alternately energized and de-energized. This accomplishes the alternate breaking and making of contact 67 (previously described), the alternate making and breaking of the contact 92, the alternate making and breaking of the contacts 93 (FIG. 6), and the alternate breaking and making of the contact 94.

The making and breaking of the contact 92 alternately closes and opens a connection from the tip wire of the line of the calling number (connected to ground) to the ring of the line of the calling number (connected to negative battery), the circuit including the spring 123 (connected to the tip wire of the line of the calling number) (FIG. 5), the lead 124, lead 125, tip spring 126, lead 127, lead 128, lead 129 (FIG. 4), resistance 131, lead 132, subsidiary switch 133 of toggle switch 32, spring 134, lead 135, spring 136 (FIG. 5), tip spring 137 of the pulse check jack 52, lead 138, lead 139 (FIG. 4), lead 165, relay contact 92 (which as just stated, is alternately closed and opened by relay 63), lead 166, lead 142, lead 143 (FIG. 6), and lead 144, upper coil 145 of relay 146, lead 147, lead 148, lead 149, spring 151, ring spring 152 of pulse check jack 52, lead 153, lead 154, relay contact 155, lead 156, lead 157, lead 158, relay contact 159, lead 161, lead 162, ring lead 163, and the ring spring 164 of the calling number jack 51 which is connected to the ring wire of the line equipment and thus to negative battery. The fact that relay 100 at this time is de-energized causes the relay contact 112 to remain open so that the circuit previously described from the spring 123 through the relay contact 112 to the ring spring 164 is ineffective. Thus pulses are created in the equipment associated with the calling number just as if the calling number equipment were manually dialed.

*Operation of Stepping Switch Magnet 231*

As stated above under the heading "Dialing," as the relay 63 (FIG. 4) is alternately energized and de-energized, it also accomplished the alternate making and breaking of the contact 92; alternately makes the circuit complete from the ring 164 to the spring 123 of the calling number jack 51 and breaks such circuit; and thus alternately closes and opens the circuit for the calling number equipment creating a pulse in the calling number equipment exactly the same as if the calling number equipment were manually dialed. This pulsing would continue indefinitely were it not for the means provided for interrupting it by means of apparatus now to be described. This means includes some of the switches, jacks, relays and wiring previously described. It also includes the minor stepping switch magnets 231 (FIG. 6) and 232 (FIG. 7), the stepping switch 233 including contact bank 233*a* of stepping switch 233 (FIG. 6), the stepping switch 234 including its contact bank 234*a*, the stepping switch 235 (FIG. 7), including its contact bank 235*a*, and the stepping switch 236 including its contact bank 236*a*, the digit switches 17 to 26 inclusive (FIGS. 6 and 7), and the trunk off switch 27 (FIG. 7), and relays 250 (FIG. 4), 297 (FIG. 4), 298 (FIG. 5), and 299 (FIG. 5) (the function of all of which is later to be more fully described).

Before dialing is started, the pulse generator starting switch 31 (FIG. 4) is closed, the originate call switch 32 is closed, and plugs are inserted in the calling number jack 51 (FIG. 5), the called number jack 54, and the battery and ground jack 55 (FIG. 4). Relay 63 is energized as is relay 100. Relays 191 and 204 are not energized, nor are relays 146 (FIG. 5) 250 (FIG. 4), 297 (FIG. 4), 298 (FIG. 5) and 299. Relay contacts 206 (FIG. 7) are closed (because relay 146 (FIG. 5) is not energized). Relay contacts 209 (FIG. 7) are closed (because relay 298 (FIG. 5) is not energized). Relay contacts 117 (FIG. 6) are closed because relay 100 (FIG. 4) is energized. Relay contacts 116 (FIG. 6) are open because of relay 100 (FIG. 4), and relay contacts 94 (FIG. 6) are open because of relay 63 (FIG. 4). Therefore no current flows to minor switch magnet 231 (FIG. 6). Now when the dial start switch 33 (FIG. 4) is closed it closes the circuit through and energizes the relay 191 which in turn energizes the relay 204 as previously described, and this breaks the connections at relay contacts 105 and 193 to de-energize the relay 100. This in turn breaks the connection at relay contact 115 (FIG. 6) and de-energizes the relay 63 (FIG. 4). With the relay 204 energized and with relays 63 and 100 de-energized, and with relays 146 (FIG. 5) and 298 de-energized, a circuit is formed from the main ground 205 (FIG. 7) to the minor switch magnet 231 (FIG. 6). Relay contacts 206 (FIG. 7) are closed (because the relay 146 (FIG. 5) is de-energized), contacts 209 (FIG. 7) are closed (because the relay 198 (FIG. 5) is de-energized), contacts 94 (FIG. 6) are closed (because the relay 63 (FIG. 4) is de-energized), contacts 116 (FIG. 6) are closed (because the relay 100 (FIG. 4) is de-energized) and contacts 196 (FIG. 6) are closed (because the relay 191 (FIG. 4) is energized). Therefore a circuit is formed from the ground 205 (FIG. 7) through contacts 206, the leads 207 and 208, contacts 209, the leads 211 and 253 (FIG. 6), the lead 266, contacts 94, the leads 277 and 278, contacts 116, the lead 279, contacts 196, the leads 281, 282, and 283, through the minor switch magnet 231 to the negative battery 284. This causes the movable wiper 251, associated with the bank 234*a*, and the movable wiper 252, associated with the bank 233*a*, each to advance one step.

The energizing of minor stepping switch magnet 231 moves the "rotary off normal" contacts 280 to an "on" position. Contact 280 will now stay closed, until positively released by the associated release magnet 324, through a mechanical locking arrangement.

*Operation of Stepping Switch Magnet 232*

Another circuit is formed under the same condition which circuit may be traced from main ground 205 (FIG. 7) through contacts 206 (closed because relay 146 is not energized), leads 207 and 208, contact 209 (closed because the relay 298 is not yet energized), lead 211, lead 253 (FIG. 6), lead 254, contact 118 (closed because the relay 100 has been de-energized), leads 255, 256, contact 197 (closed by operation of the relay 191), lead 257, contact 258 (FIG. 7) (closed because the relay 298 is not yet energized), leads 259, 261, 262, to minor switch magnet 232 and thence to negative battery connection 263. This energizes minor switch magnet 232 and thus causes the movable wiper 264, associated with the bank 235*a*, and the movable wiper 265, associated with the bank 236*a*, each to advance one step. It also causes "rotary off normal" contact 296 to be moved to a closed position, which will stay closed, until released by the associated release magnet 445, through a mechanical locking arrangement.

*De-energizing of Minor Switch Magnet 231*

When during the pulsing operation, relay 63 (FIG. 4) is energized, contacts 94 (FIG. 6) are broken thereby and then current ceases to flow to the magnet 231 (FIG. 6) and the minor switch stepping lever releases. However, the movable contact wipers 251 and 252 are then held in their new positions mechanically and do not go back to their initial position. Neither is the "rotary off normal" contacts 280 released to its "off" position, but remains closed until positively released, by the release magnet 384. When the relay 63 is again de-energized in the pulsing cycle the magnet 231 is again energized and these movable wipers 251 and 252 are again advanced one step. Therefore as the pulsing cycle operates to energize and de-energize the relay 63, the movable contact wipers 251 and 252 are each advanced one step for each pulse created by the pulsing circuit. However, it should be noted that contacts 94 are not in the circuit controlling minor switch magnet 232 and there is at this time no further stepping of movable wipers 264 and 265, associated with banks 235*a* and 236*a*.

Thus during the pulsing operation, the relays 191 (FIG. 4) and 204 are energized while the relays 100, 250, 146, 298 and 299 are not energized and relays 61, 62 and 63 are alternately de-energized and energized. Each time the relay 63 is energized the contact 94 is broken and the contacts at 93 are closed. When the relay 63 is de-energized, the contacts at 93 are broken and the contact at 94 is again made. Thus, for each pulse a circuit is formed through the minor switch stepping magnet 231 which steps the wiper 252 on the contact bank 233*a* and steps the wiper 251 upon the contact bank 234*a*.

If it is desired to test the correctness of the pulsing operation, a pulse meter is plugged into pulse check jack 52 by which the correctness of the pulses can be determined.

*General Description of FIGURE 8*

Now for the purpose of simplifying the description of the next operation, I refer to FIG. 8 in which is shown a simplified diagram showing a portion of the diagram of FIGS. 6 and 7, but utilizing only three of the digit switches. Thus, of the digit switches 17 to 26 inclusive, only the switches 17, 18 and 19 are shown, the others being omitted for simplification and clarity. The trunk off switch 27 and the stepping switches 235 and 236 have been simplified and are designated respectively 27*b*, 235*b* and 236*b*. Digit switch 17 is set for dialing two pulses; digit switch 18 is set for dialing one pulse and digit switch 19 is set for dialing three pulses. The trunk off switch 27*a* is set for a limit of dialing three digits. The movable wipers 251 and 252 are shown in the position they assume after they have been stepped by the minor stepping switch magnet 231 to their second contacts. The movable contact wipers 264 and 265 are shown in the position they assume after they have been moved by the minor stepping switch magnet 232 to their first contacts. These modifications are shown mainly for the purpose of simplifying the explanation.

Referring further to FIG. 8 for a more detailed description thereof, it may be seen that I have shown digit switches 17, 18 and 19, the bank contacts of the stepping switches 233, 234, 245*b* and 236*b*, the trunk off switch 27*b* and the movable contact wipers 251, 252, 264 and 265. The bank contact 234*a* of the stepping switch 234 has fixed contacts 301, 302, 303, 304, 305, 306, 307, 308, 309 and 310, with which the movable contact wiper 251 contacts in turn. The bank contact 233*a* of the stepping switch 233 similarly has fixed contacts 311–320, inclusive. The digit switch 17 has fixed contacts 321–330, inclusive. The digit switch 17 has fixed contacts 331–340, inclusive, and the digit switch 19 has fixed contacts 341–350, inclusive. The digit switches 17, 18 and 19 are provided with movable contact wipers 351, 352 and 353 respectively. The trunk off switch 27*b* is provided with a movable contact wiper 354 and with fixed contacts 355, 356 and 357. The stepping switch 235*b* is provided with a movable contact wiper 264 and with fixed contacts 361, 362 and 363. The stepping switch 236*b* is provided with a movable contact wiper 265 and with fixed contacts 364, 365 and 366.

As shown in FIG. 8, the movable contact wiper 251 has been advanced to the contact 302, the movable contact wiper 252 has been advanced to the contact 312, and the contact 280 has been closed by the stepping switch magnet 231. The contact 296 has been closed by the stepping switch magnet 232. The wipers of the digit switches 17, 18 and 19 have been set so that the wipers thereof contact the corresponding fixed contact to limit its pulsing to the number set to be dialed consisting of the three digits 2, 1, 3, in order.

*Detailed Operation of Stepping Switch 321*

With relays 204 and 191 (FIG. 4) energized, but with the relays 100, 250, 297, 146 (FIG. 5), 298 and 299 de-energized and with the pulsing relays 61, 62 and 63 (FIG. 4) alternately energized and de-energized in the pulsing operation, whenever relay 63 is de-energized a circuit is formed from the main ground 205 (FIG. 7) through the relay contact 206, lead 207, lead 208, relay contacts 209, lead 211, lead 253 (FIG. 6), lead 266, contact 94, lead 277, lead 278, contacts 116, lead 279, contact 196, lead 281, lead 282 (see also FIG. 8), lead 283, stepping switch magnet 231 to negative battery 284. This energizes the stepping switch magnet 231 and thus steps the movable wipers 251 and 252 to fixed contacts 301 and 311.

*Detailed Operation of Switch 232*

Under the same conditions (i.e. with relays 204 and 191 energized but with relays 100, 146, 250, 298 and 299 de-energized) another circuit is formed as follows: From the main ground 205 through relay contacts 206, the leads 207 and 208, relay contacts 209, the leads 211, 253, 254, relay contacts 118, the leads 255 and 256, contacts 197, lead 257, contact 258 (FIG. 7), leads 259 (see also FIG. 8) 261, and 262, stepping switch magnet 232 and negative battery connection 263. This energizes the minor switch magnet 232 which steps the movable contact wipers 264 and 265 to contact with fixed contacts 361 and 364 (FIG. 8) and also closes the "rotary off normal" contacts 296. The effect of this operation will appear later.

*Further Operation*

Inasmuch as contact 301 and contact 311 of stepping switches 234 and 233 do not complete any circuit (ground must be received by wiper 251 from wiper 264), the pulsing continues and the relay 63 is in due course again energized. When it is energized again it breaks the circuit by opening the contacts 94, but when it is again de-energized it completes another circuit in the same way as explained above through the stepping switch magnet 231 and again steps the movable contact wiper 251 and movable contact wiper 252 to the fixed contacts 302 and 312. When the relay 63 is again energized it closes the contacts 93 and forms a circuit as is shown in FIG. 8 as follows:

From the main ground 205 (FIG. 7) to the contact 206, lead 207 and lead 208, contact 209, lead 211, lead 253 (FIG. 6) lead 266, contact 93, the lead 281, lead 292 (see also FIG. 8), lead 293, lead 294, contact 296 (which has been closed, as described above, by the stepping switch 232), lead 295, the movable contact wiper 264 of the stepping switch 235*b* (FIG. 8), the fixed contact 361, the lead 391, lead 392, lead 393, the movable contact wiper 351 which is set, as shown, in contact with the fixed contact 322, said fixed contact 322, the leads 394, 395, 396, to the fixed contact 302, the movable contact wiper 251, leads 371, 372 and 373, relay 250 (FIG. 4), and a negative battery connection 374. This energizes the relay 250 which closes the contact 375 and connects the ground at 376 through contact 375 and leads 377 and 109 to relay 100 and negative battery 111. This energizes relay 100 which now closes the contacts at 115 (FIG. 6), connecting the ground at 120, through the relay 63 (FIG. 4) to negative battery connection 86, to hold the relay 63 and stopping the pulsing until after the relay 250 is again de-energized. Pulsing is also stopped to the equipment attached to the calling number jack 51 through contacts 92.

When both the relay 100 and the relay 250 are energized, the condenser 248 is shorted out by the connection between the ground 376 and said condenser consisting of the relay contacts 375, the leads 377 and 377*a*, the relay contacts 114 and the lead 377*b*. This guarantees that the condenser 248 will at that time be in a discharged condition.

*Other Effects of Energization of Relay 250*

The energization of relay 100 breaks the contact at 118 (FIG. 6) and closes the contact at 117. The breaking of the contact at 118 breaks the circuit through stepping switch magnet 232 (FIG. 7). This de-energizes the stepping switch magnet 232 but does not return the movable contact wipers 264 and 265 to their off position, these wipers being held against contacts 361 and 364 (FIG. 8) by mechanical means. Nor does it release the contacts 296 which is held in a closed position by mechanical means until released positively by means later to be described. The closing of the contacts 117 (FIG. 6) creates a circuit from the main ground at 205 (FIG. 7) through the contacts 206, leads 207, 208, contacts 209, leads 211, 253 (FIG. 6), 254, contacts 117, leads 378, 379, 381, contacts 280, lead 383, release magnet 384, to negative battery at 385. It must be remembered that the contact at 280 was closed by operation of the minor switch 231 and has remained closed until now when it will be opened by operation of the release magnet 384.

As stated above, the energizing of the relay 100 (FIG. 4) energizes the relay 63 (FIG. 6) and holds that relay energized from the ground 120. The energizing of the relay 63 breaks the connection at contacts 94 and makes a connection at contacts 93. The breaking of the connection at contacts 94 de-energizes the stepping switch magnet 231 as above described and with the result above described.

*Effect of Operation of Release Magnet 384*

The circuit through the release magnet 384 energizes that magnet and the operation thereof returns the wipers 251 and 252 from the position shown in FIG. 8 to the normal position shown in FIG. 6 and operates the RON contacts 280 to its off position, thus breaking the connection at contacts 280 until the stepping switch magnet 231 again is energized. The circuit from the ground to relay 250 through the contacts 206 (FIG. 7), leads 207, 208, contacts 209, leads 211, 253 (FIG. 6), 254, contacts 117, leads 378, 386, 387 (FIG. 7), 388, movable contact wiper 265 and contact 366 is not completed because the wiper 265 has not yet reached the contact 366 (FIG. 8) which is connected to the movable wiper 354 of the trunk off switch 27*a*.

As stated above, the operation of release magnet 384 releases the movable contact wiper 251 and movable contact wiper 252 back to the position shown in FIG. 6. This breaks the contact between the wiper 251 and fixed contact 302 and thus breaks the circuit from ground 205 to negative battery connection 374 through relay 250 and de-energizes relay 250.

*De-Energization of Relays 250, 100 and 63*

In turn, the de-energization of relay 250 (FIG. 4) breaks the contact at 375 and de-energizes the relay 100. However, the charging of the capacitor 248 in series with relay 100, holds the relay 100, for a short interval before it is de-energized. Nevertheless, the removal of the holding ground at 375 from the relay 100 allows relay 100 to release after a short period of time as explained above. Relay 100 in releasing, opens contacts 115 and removes the ground to relay 63, allowing relay 63 to de-energize. The release of relay 100 closes the relay contacts 118 (FIG. 6) and thus operates stepping switch magnet 232 again. This moves the contact wiper 264 to fixed contact 362 (FIG. 8), preparing it to receive the next digit dialed. The de-energization of relay 100 also opens the contacts 117 (FIG. 6). This has no real effect at the moment because the circuit from the ground 205 through contacts 117 and through magnet 384 to negative battery 385 was broken at contacts 280 when release magnet 384 was energized. The relay 100 (FIG. 4) in releasing also removes the short from across the pulsing contact 92 at relay 63. Relay 63 in being de-energized breaks the contact at 93 and makes the contact at 94. The making of the contact at 94 (as explained above) energizes the stepping switch magnet 231 again to advance the movable contact wipers 251 and 252 to the first fixed contacts 301 and 311. The de-energization of the relay 100 also allows the relay contacts 118 to close. This operates the magnet 232 as explained above to step the movable contact wiper 264, stepping it this time from the fixed contact 361 to the next fixed contact 362.

*Further Stepping by Stepping Switch Magnets 231 and 232*

As stated above, when the release magnet 384 is operated as described above, it not only breaks the contact 280 but also returns the movable wipers 251 and 252 back from the position shown in FIG. 8 to the position shown in FIG. 6 as described above. The movement of the movable wiper 251 from the fixed contact 302 breaks the circuit including the relay 250, thus opening the relay contacts 375 and removing the ground from the relay 100 so that the relay 100 is de-energized (after a short delay due to the charging of the condenser 248). The de-energization of the relay 100 allows contacts 115 to open and thus breaks the connection from the ground 120 to the relay 63. It closes the contacts 118 and thus operates the stepping switch magnet 232 again. Relay 63 is thus de-energized and the pulsing action again starts. De-energization of the relay 63 closes contacts 94 and operates the magnet 231 as described above and causes the wiper 251 to be moved to the fixed contact 301. When the relay 63 is again energized in the pulsing action, it closes the contact 93. This creates a circuit as follows: From the main ground at 205 (FIG. 7) through the relay contacts 206, the leads 207 and 208, the relay contacts 209, lead 211, lead 253 (FIG. 6), lead 266, the relay contacts 93, leads 291, 292, 293 (FIG. 7), 294, contacts 296, lead 295, movable contact wiper 264, fixed contact 362 (FIG. 8), leads 401, 402, 403, movable contact wiper 352, fixed contact element 331, leads 404, 405, 406, fixed contact element 301, movable contact wiper 251, leads 371, 372 and 373, through relay 250 (FIG. 4) to negative battery connection 374. This energizes relay 250, which again in turn, as described above, energizes first the relay 100, then the relay 63, then the release magnet 384, then breaks the contact between the movable wiper 251 and the fixed contact 301, and breaks the contacts at 280. Then successively relay 250 is de-energized, the relay 100 is de-energized, the magnet 232 is operated to step the wiper 264 to the contact 363, and the relay 63 is de-energized. This again forms a circuit through the stepping switch magnet 231 which closes the relay contacts 280 and moves the movable wiper 251 to the contact 301. The relays 61, 62 and 63 are successively energized in the pulsing cycle and the energizing of the relay 63 breaks the contact at 94 de-energizing the magnet 231. As the pulsing continues, the relay 63 is de-energized and the contacts at 94 are again closed and the magnet 231 is again energized. This steps the movable wiper 251 to the contact 302, the continued pulsing energizes the relay 63, de-energizing the magnet 231, and again as relay 63 is de-energized, again energizes the magnet 231 which steps the movable wiper 251 to the fixed contact 303. When the relay 63 is next energized, a circuit is then formed from the main ground 205 (FIG. 7) through the relay contacts 206, the leads 207 and 208, the relay contacts 209, lead 211, lead 253 (FIG. 6), lead 266, the relay contacts 93, leads 291, 292, 293 (FIG. 7), and 294, contacts 296, the movable wiper 264, the fixed contact 363 (FIG. 8), leads 407, 408, and 409, the movable wiper 353, the contact 343, lead 411, lead 412, lead 413, the fixed contact 303, movable wiper 251, lead 372, 373, relay 250 (FIG. 4), and the negative battery connection 374. Relay 250 energizes as explained above.

*Completion of Dialing*

When relay 250 energizes, the relays 100 and 63 energize as before. However, there is this difference. The energization of the relay 100 closes relay contacts 117 which energizes the magnet 384 and returns the movable wipers 251 and 252 to the position shown in FIG. 6 at the same time that it breaks the contact at contacts 280 as before. However, relay 250 is not de-energized by the return of movable wiper 251 to the position of FIG. 6 because another circuit is provided which holds relay 250 energized. This circuit is formed from the main ground 205 (FIG. 7) through the relay contacts 206, the leads 207 and 208, the relay contacts 209, leads 211 and 253 (FIG. 6), lead 254, contacts 117, the leads 378, 386, 387, 388, movable wiper 265, fixed contact 366 (FIG. 8), the leads 414, 415, the fixed contact 357, the movable wiper 354, the leads 416, 417 and 418, and 373 through the relay 250 (FIG. 4) to the ground 374. This holds the relay 250 energized and through it the relays 100 and 63, and the pulsing stops.

The energizing of the relay 100 (FIG. 4) operates the relay contacts 119 (FIG. 6) and thus closes the circuit from the ground 168 (FIG. 6), through contacts 119, and through the leads 171, 172 (FIG. 7), 173, 174, 175 and 176 to the alarm 45 and to the negative battery connection 177. This sounds the alarm continuously.

However, the device has now pulsed the number which was set on the digit switches 17, 18 and 19, sending these pulses through the calling number jack (i.e. it has dialed the number 213 which we are assuming is the called number). The equipment associated with number 213 sends ringing current (A.C.) on the called number attached to the called number jack 54 and the ringing (A.C.) current is transmitted from the called number jack 54 through leads 421, 422, 423, 424, 425 (through the capacitors 426 or 426*a*), through lead 427, relay contacts 428 (FIG. 4) and leads 429, 429*a* and 429*b*, through the A.C. relay 297 to the ground at 431. This operates the A.C. relay 297 which in turn closes the relay contacts 432 and connects the ground at 433 through said relay contacts 432 and leads 434 and 435 (FIG. 5) to the relay 298, and through it to negative battery at 436. During all this time the calling number equipment has been seized by the circuit inasmuch as whenever the relay 63 is energized, the relay contacts 92 (FIG. 4) are closed, creating a circuit through the calling number equipment. The intervals between pulses created by the cycling of relays 61, 62 and 63 are not sufficient to release the calling number. However, the energization of relay 298 (FIG. 5) breaks the relay contact 159 long enough to release the calling number equipment which in turn releases the equipment associated with the called number, thus removing the ringing current from the called number circuit, and releases relay 191, because ground is removed from the sleeve of the calling number jack 51. The cessation of the ringing current from called number jack 54 releases relay 297. This breaks the relay contacts 432 and releases the relay 298. However, while the relay 298 was energized it not only (1) opened the relay contacts at 159, but also (2) made a connection at relay contacts 438, (3) broke a connection at relay contacts 439, (4) broke relay contacts at 209 and 258, and (5) made a connection at a relay contact 441. The breaking of the contact at 209 breaks the circuits through relay 204 and releases that relay. When the relay 298 releases, it restores the connections at contacts 159, 437, 439, 209 and 258, and breaks the contacts at 438 and 441. This restores the routiner to the condition shown in FIGS. 4, 5, 6 and 7.

The operation of relay contacts 441 (FIG. 7) closes a circuit from the main ground 205 through the relay contacts 206, leads 207 and 208, the relay contacts 441, the leads 442, 443 and 444, to release magnet 445 and through it to negative battery at 446. This energizes the release magnet 445 and moves the movable contact wipers 264 and 265 back to the position shown in FIG. 7. It also operates the rotary off normal contacts 296 to its open position.

The release of relay 297 opens contact 432 and thus releases relay 298. As soon as the relays 63, 100, 250, 297 and 298 have released, the apparatus is back in the same condition that it was when dialing was commenced, and the dialing is ready to be repeated.

*Answer Connector Feature*

Relay coil 146 is connected as previously described, to the tip 123 of "calling number" jack 51 and to the ring 164 thereof, thus drawing current. But relay 146 is a 2-coil (both coils on the same core) relay and is so wired that the magnetic field set up by both coils oppose each other, thus preventing the relay armature from operating. As long as the tip 123 has positive potential and the ring 164 has negative potential applied to them, relay 146 cannot operate. There is, however, a relay in the connector switch of the switch train of the telephone equipment called the "answer relay." This relay operates when a short is applied to the answer side of the connector switch. This relay, when operated, will reverse the polarity of the calling number tip 123 and ring 164. When this reversal occurs, relay 146 will operate as the magnetic field of its 2 coils will now aid each other. When relay 146 operates it breaks contacts at 155 and 206, and makes contacts at 494 and 495. The breaking of the contact at 155 releases the telephone equipment of the calling number connected to the calling number jack 51. It also breaks the circuit through 145 and thus de-energizes the relay 146 and allows the contacts 155 to again close. The closing of the contacts 494 connects a ground at 493 to the relay 100 to energize it, thus holding the relay 63 energized. The breaking of the contacts at 206 releases all equipment dependent on the main ground 205. Relay 146 will not operate until relay 299 operates and the connector switch is answered. This action takes place as described hereinafter.

The connector switch is that switch in the train of the telephone equipment which receives the last three digits of the called number. It removes the polarity that exists on the called number tip and ring, as explained above, and applies A.C. ringing current. This ringing current is applied in short periods of time. In the silent period it again supplies a positive and negative potential to the called number tip and ring, this potential being applied through the answer relay.

When the answer conector switch 37 (FIG. 4) on the routiner is operated to its "on" position, relay 299 (FIG. 5) will also be operated from the ground 481 (FIG. 4) at the toggle switch 37, over leads 482 and 483 through relay contacts 438, through leads 484, 485 and 486, to relay 299, and to negative battery potential 487. This action takes place after relay 297 has been operated from the A.C. current from the connector switch and relay 298 has been operated from relay 297. Another circuit is formed from the ground 481, over leads 482 and 483, contacts 433, leads 484, 485, 488 and 489, through "connector answered" lamp 42 and to negative ground at 490.

Relay 298 opens the relay contacts 159, thus starting to release the equipment attached to the calling number jack 51, but relay 299 closes relay contact 491 which closes a multiple short to the same calling number jack 51 tip and ring, this action being too fast for the equipment ahead of the calling number jack 51 to release. Relay 299 also closes relay contacts 492 through a 500 ohm resistor 493 to the answer side of the connector switch. The connector "answered lamp" 42 then indicates that the routiner relay 299 is to furnish this 500 ohm short, and further that the routiner is not to re-cycle until the telephone equipment connector switch has reversed the polarity back to the calling number jack 51, allowing relay 146 to operate. If this condition fails to exist, then the routiner will not re-cycle since relay 146 starts the re-cycling condition when the answer connector toggle switch 37 is operated. If the routiner does not re-cycle, the alarm buzzer 45 will sound continuously.

The operation of the relay 297 (FIG. 4) (indicating that a call has been completed and that ringing current is being received on the called number jack 54) operates the calls completed meter as follows: The relay 297 operates the relay contacts 432 to connect the ground 433 through the relay contacts 432 and the leads 447, 448, 449, 451, 452, 453 (FIG. 5), 454, 455, to meter 44 and through it to negative battery at 456.

When the relay 298 is released, thus placing the device in condition to initiate a new call as explained above, it breaks the contact at relay contacts 441 (FIG. 7), and closes the contact at relay contacts 209. This closes a circuit from the ground 205 through the relay contacts 206, the leads 207 and 208, the contact 209, leads 211, 212 (FIG. 6), 213 (FIG. 4), the relay contacts 195, lead 214, the leads 461, 462 (FIG. 6), 463 (FIG. 7), 464 (FIG. 5), and through meter 43 to negative battery at 465. This causes the calls originated meter to register.

Leads 501 and 502 connect answer connector toggle switch 37 with the junction of leads 207 and 208. Relay contact 504 controlled by relay 297 is connected on one side to relay 462 and on the other through leads 505, 506, and 507 and through relay 297 to negative battery connection 508. Leads 511 and 512 connect C-lead hold toggle switch 34 with answer connector toggle switch 37. Lead 513 connects the junction of leads 511 and 512 with the junction of leads 212, 213 and 219. Lead 514 connects C-lead hold toggle switch 34 with relay contacts 225. Leads 515 and 516 connect answer connector toggle switch 37 with the junction of leads 156 and 157. Lead 518 connects lead 161 with relay contacts 491, and lead 519 connects said relay contacts 491 with the junction of leads 157 and 158. Lead 521 connects relay switch 492 with the junction of leads 421 and 422, and lead 522 connects relay contacts 492 with resistor 493. The resistor 493 and the lead 522 are in turn connected by a lead 523 with relay contacts 495. A lead 524 connects relay switch 439 with relay contacts 525 and relay switch 525 is also connected by lead 526 with the junction of leads 172 and 173. Lead 527 connects the junction of leads 161 and 162 with answer connector toggle switch 37. Relay contacts 528 at times connect ground 529 with lead 418 and relay contacts 531 at times connect ground 532 with lead 418.

In the event that the dialing is not completed on account of a failure of the telephone equipment with which it is connected, the equipment normally remains seized and the alarm sounds continuously. The supervisor then investigates the telephone equipment and corrects the faulty condition. Thereafter he closes the manual release switch 36 (FIG. 4). This connects the lead 448 to the ground 471 of switch 36 and disconnects the lead 449 from lead 451. This operates the relay 298 to restore the equipment to operating condition as previously described and prevents the calls completed meter 44 from registering a false registration.

The equipment attached to the calling number jack 51 (FIG. 5) is seized by a short across the tip ring leads. When the connector switch in the switch train of the calling number puts the A.C. current forward to the called number jack 54 (assuming the correct number has been reached), the relay 297 (FIG. 4) will operate from this A.C. current. The relay 297 now operates relay 298 (FIG. 5). The relay 298 opens contacts 159 which closed a short to the tip ring leads, of the calling number jack 51. The opening of this short releases the equipment attached to the calling number jack 51. This equipment in releasing removes the ground from the sleeve 181 of the calling number jack 51. When this occurs, relays 191 and 204 (FIG. 4) will release. The relays 100 and 250 were also energized when relay 298 operated. Relay 298 now is released because relay 297 is released, no longer having A.C. current applied to it since the connector switch has been released by the removal of the short as explained above. After a short period of time, relays 100 and 250 will release. When relay 298 (FIG. 5) releases, it closes the short 159 to the telephone equipment attached to the calling number jack 51, thus seizing this equipment again. Relays 191 and 204 (FIG. 4) now operate from the ground on the sleeve 181 (FIG. 5) of the calling number jack 51. The routiner will now start to send the number being called again.

*General Operation*

The operation has been explained in the description of the device. However, a résumé thereof at this point may be helpful.

Before the routiner is started for operation all seven toggle switches are set to their "off" position, then plugs are inserted in the battery and ground jack 55 (FIG. 4), the calling number jack 51 (FIG. 5), the called number jack 54, and the switches 17–26 inclusive (FIGS. 6 and 7), are set to the various digits contained in the selected calling number. The trunk off switch 27 (FIG. 7) is set to the number corresponding to the total number of digits contained in the selected number to be dialed. Then the pulse generator start switch 31 (FIG. 4) is turned to its "on" position. This starts the three-relay (61, 62, 63) pulse generator running. The relays are allowed to run for a period of 15 minutes or more to warm up, then the originate call switch 32 is turned to its "on" position. Then the dial start toggle switch 33 is turned to its "on" position. Relays 191 and 204 operate, as explained above, from the ground on the C-lead 181 (FIG. 5) of the calling number 51. Relay 100 (FIG. 4) releases after a short period of time depending upon the setting of the 10,000 ohm variable resistance 249 which is in series with the 500 mf. condenser 248. When the relay 100 releases it removes a short from relay 63. Relay 63 then begins to create dial pulses which operate the calling number equipment the same as a subscriber's dial would do. As relay 63 pulses the calling number equipment it also steps stepping switch magnet 231 (FIG. 6) one step for each pulse. When stepping switch magnet 231 reaches its bank contact corresponding to the setting of digit switch 17 the relay 250 (FIG. 4) operates.

Relay 250 operates relay 100. Relay 100 shorts the pulsing contacts of relay 63 and also stops the pulse generator relays 61, 62 and 63 from operating continuously. This is done so that the first pulse of the digit is just as good (i.e. long) as any succeeding pulse of the digit. Relay 100 also releases stepping switch magnet 231 (FIG. 6) to its normal position. Stepping switch magnet 231 in releasing, releases relay 250 (FIG. 4). Relay 250 in releasing, removes the holding ground from relay 100. After a short period of time as explained above, relay 100 will release. Relay 100 in releasing removes the short from across the pulsing contacts of relay 63 and removes the holding ground from relay 63. It also steps stepping switch magnet 232 (FIG. 7) to its next bank contact.

Relays 61, 62 and 63 (FIG. 4) now start operating again. Relay 63 again starts pulsing the calling number equipment and the stepping switch 231 (FIG. 6). When stepping switch 231 reaches its bank contact corresponding to the setting of digit switch 18, relay 250 (FIG. 4) will operate. The procedure listed in the last paragraph is then repeated.

The procedure listed in the last paragraph will be repeated for each digit corresponding to the settings of all of the digit switches. When stepping switch magnet 232 (FIG. 7) reaches its bank contact corresponding to the setting of the trunk off switch 27, relay 250 (FIG. 4) will be locked up after it is operated from stepping switch magnet 231 (FIG. 6). The total number of digits corresponding to the called number as set up on the digit switches has now been dialed. If dialing has proceeded correctly the connector switch will be connected to the number that the plug plugged into the called number jack 54 (FIG. 5) is clipped to.

The connector switch of the dialed telephone equipment now forwards A.C. generator current to the routiner by the called number cord on either the tip or sleeve of the cord. The relay 297 (FIG. 4) will operate from this A.C. generator current. The relay 297 operates relay 298 (FIG. 5). Relay 298 opens the tip ring short to the calling number equipment by opening contacts 159, releasing the equipment. Relay 298 also releases stepping switch magnet 232 (FIG. 7) which in turn releases relays 100 and 250 (FIG. 4). Relay 298 (FIG. 5) also releases relays 191 and 204 (FIG. 4). Relay 298 now releases, because the calling number equipment is released. The routiner is now in a normal condition ready to re-dial the called number as described above.

If the 1,000 ohm loop toggle switch 35 (FIG. 4) is in its "off" position, the tip ring loop consists of 1,060 ohms. If this toggle switch is operated to its "on" position, the tip ring loop will be 560 ohms. These two resistance loops will duplicate the conditions normally encountered on the subscriber's line.

If the routiner should encounter an open tip ring loop in the calling number equipment, the calling number equipment can be locked in this condition by operating the C-lead hold toggle switch 34 (FIG. 4) to its "on" position before the routiner starts dialing. The maintenance personnel can therefore easily locate the fault in the tip ring loop.

If the answer connector toggle switch 37 is operated before the routiner starts dialing, the routiner will not be released as soon as the relay 298 (FIG. 5) operates, but must wait until relay 146 is operated by the tip ring lead reversal by the connector switch in the calling number equipment. The answer connector lamp 42 visually indicates this condition.

The manual release toggle switch 36 can be used to release the routiner to its normal position at any desired time. It is usually used if a wrong number or an incomplete dialing cycle has been reached.

If it is desired to listen on the line while dialing, a receiver can be plugged into the receiver jack 53. This is useful to check for any busy or calling number equipment butt-ins that may be encountered.

This routiner may be used to dial from any part of the switch train used in the calling number equipment by attaching the tip ring sleeve wires of the cord used for the calling number equipment to the tip ring C-leads respectively of the desired switch. However, for each switch eliminated in the train, the trunk off switch 27 (FIG. 7) and the digit switches 17–26 (FIGS. 6 and 7) must be set accordingly. For instance, if the routiner is to be attached to the second switch in the train, the first digit of the number is to be dropped and the digit switch 17 should be set to the second digit of the number, the digit switch 18 to the third digit of the number, etc. The trunk off switch 27 would be set to the total number of digits left to be dialed in the number. If the routiner is to be attached to the connector switch then a maximum of three digits could be dialed and only switches 17, 18 and 19 would be used. The trunk off switch would be set to three.

If the routiner is to be used to dial toll codes within the exchange, then a ring out trunk termination will have to be provided as the called number trunk in place of the called number line equipment used in the local subscriber equipment part of the exchange.

The audible alarm will sound intermittently as long as dialing is proceeding. This will give the maintenance personnel an audible indication that dialing is proceeding.

The readings on the calls originated and calls completed meters will show the calls tried and the calls correctly completed and by subtracting the calls completed meter reading from the calls originated meter reading, the number of lost calls that the subscribers would be receiving is known.

It is to be understood that the above described embodiments of my invention are for the purpose of illustration only and various changes may be made therein without departing from the spirit and scope of the invention.

I claim:

1. In a telephone exchange system having a plurality of subscribers' lines and pulse responsive equipment operable to establish a connection between any two subscribers' lines, a testing device having, in addition to a group of manually operated individual digit indicating rotary switches, a manually operated total digits indicating rotary switch, an electrically operated rotary switch to select, in sequence, the manually operated individual digit indicating rotary switches, an electrically operated rotary switch to integrate the total pulses indicated by the manually operated individual digit indicating switches, connectible to any two of the said subscribers' lines, a group of relays to create pulses of proper speed and ratio to operate said pulse responsive equipment for the purpose of establishing a connection between the said two selected subscribers' lines, and means comprising a group of contacts controlled by said relays, a lamp, and connections between said contacts and said lamp to visually indicate that the pulse creating relays are operating.

2. The testing device according to claim 1, and having, in addition to a generator responsive relay to control the re-starting of the pulse transmission, a relay operable through the reversal of the tip-ring leads, associated with subscribers' line selected as the calling line, by the pulse responsive equipment, said relay controlling the re-starting of the pulse transmission cycle in conjunction with the generator responsive relay and having a manually operated toggle switch to transfer the re-starting cycle from the control of the generator responsive relay alone to the dual control of the generator responsive relay and the said relay operable by the tip-ring reversal, and having a lamp to visually indicate that the said tip-ring reversal feature is being tested.

3. In an automatic dialing routiner and grade of service recorder for operating and testing certain selected telephone equipment in combination, means comprising a pulse generator for applying pulses to a switch train of said selected telephone equipment; and means comprising a plurality of digit switches, a stepping switch, and electrical connections between said pulse generator, said digit switches, and said stepping switch for controlling the pulse generator and for automatically selecting the digits to be dialed;

an alarm bell;

means comprising a contact, and electrical connections between said contact and said alarm bell effective when said telephone equipment is being operated to operate said alarm during the period between the digits of the selected number;

and means comprising a relay controlling said contact, effective when there is a stoppage of the operating of the said telephone equipment to operate said alarm continuously.

4. In an automatic dialing routiner and grade of service recorder for operating, testing and recording the operation of selected telephone equipment having a connector switch and an answer relay in said connector switch in which the telephone equipment is capable of causing a current reversal from the answer relay of the connector switch on the calling side of the equipment to be returned to the routiner, in combination, means comprising a pulse generator for applying electrical pulses to said selected telephone equipment;

means comprising a plurality of digit switches, a stepping switch magnet, and electrical connections between said pulse generator, said digit switches, and said stepping switch magnet for controlling the pulse generator and selecting the digits to be dialed in applying said electrical pulses to said selected telephone equipment; and means, comprising a relay in the dialing routiner responsive to receipt of said current reversal by the dialing routiner from the answer relay of the connector switch of the calling side of the equipment and electrical connections connecting said relay to the calling side of the equipment, for releasing the selected telephone equipment.

5. A pulse creating generator for an automatic dialing routiner for pulsing selected telephone equipment attached to the routiner comprising, in combination, a plurality of relays including a first relay and a last relay, said first relay including a means which, when operated to a closed position by energization of the said first relay, will be effective to energize said last relay, and said last relay including a means, which when operated to an open position by the energization of said last relay, will cause said first relay to be de-energized, and said last relay also including a separate means which, when operated to a closed position by energization of said last relay, will cause the telephone equipment attached to the routiner to become energized and, which when operated to an open position by the de-energization of said last relay, will cause the telephone equipment attached to the routiner to become de-energized, the alternate energization of the said first and last relays thus causing the telephone equipment to be pulsed;

and separate means for holding the last relay energized during interdigital timing in order to guarantee that all pulses of a digit being transmitted to the telephone equipment will be of equal length to the telephone equipment being pulsed.

References Cited in the file of this patent

UNITED STATES PATENTS

| | | |
|---|---|---|
| 1,632,902 | Johnson | June 21, 1927 |
| 1,641,453 | Ostline | Sept. 6, 1927 |
| 2,293,611 | Meeds | Aug. 18, 1942 |
| 2,585,023 | Lewis | Feb. 12, 1952 |
| 2,680,161 | Clement | June 1, 1954 |
| 2,914,624 | Murray | Nov. 24, 1959 |

OTHER REFERENCES

The Design of Switching Circuits, Keister et al., copyright 1951, D. Van Nostrand Co., page 406.

UNITED STATES PATENT OFFICE

CERTIFICATE OF CORRECTION

Patent No. 3,069,512 December 18, 1962

Harry E. McAllister

It is hereby certified that error appears in the above numbered patent requiring correction and that the said Letters Patent should read as corrected below.

Column 6, lines 70 and 72, for FIG. 6", each occurrence, read -- FIG. 5 --; column 8, line 33, for "147" read -- 146 --; column 9, line 51, for "accomplished" read -- accomplishes --; column 10, line 17, after "relay 204" insert -- through contact 195 --; column 10, line 46, for "324" read -- 384 --.

Signed and sealed this 20th day of August 1963.

(SEAL)
Attest:

ERNEST W. SWIDER
Attesting Officer

DAVID L. LADD
Commissioner of Patents